United States Patent [19]

Hurst

[11] 4,044,091
[45] Aug. 23, 1977

[54] SEPARATOR FOR CONCRETE WRAPPING TO SUBMARINE PIPELINES

[75] Inventor: John Hurst, London, England

[73] Assignee: W. R. Grace Limited, London, England

[21] Appl. No.: 738,804

[22] Filed: Nov. 4, 1976

Related U.S. Application Data

[62] Division of Ser. No. 674,693, April 7, 1976.

[30] Foreign Application Priority Data

May 20, 1975 United Kingdom ............... 21596/75

[51] Int. Cl.$^2$ ............................................. B28B 23/08
[52] U.S. Cl. .................................... 264/251; 61/102; 61/112; 138/175; 264/32; 264/35; 264/263; 264/279
[58] Field of Search .................. 264/32, 35, 228, 263, 264/265, 259, 279, 251; 138/175; 61/102, 112

[56] References Cited

U.S. PATENT DOCUMENTS

| | | | |
|---|---|---|---|
| 3,758,650 | 9/1973 | Hurst | 264/35 X |
| 3,799,208 | 5/1973 | Ells | 138/175 |
| 3,848,034 | 11/1974 | Schmetter | 264/263 X |
| 3,891,732 | 6/1975 | Hurst | 264/35 X |
| 3,997,639 | 12/1976 | Rochelle | 264/265 X |

Primary Examiner—Thomas P. Pavelko
Attorney, Agent, or Firm—William L. Baker; C. E. Parker

[57] ABSTRACT

A generally T-shaped flexible spacer for use in the formation of a flexible joint in concrete cladding for pipes, having a base flange and a compressible web extending generally perpendicularly from the base flange on one side thereof. In use, spacers are applied to a pipe at intervals, and are self supporting with the web radial of the pipe. When concrete is sprayed onto the pipe it forms a cladding in sections, between which the spacers provide compressible joints to accommodate bending of the pipe.

13 Claims, 8 Drawing Figures

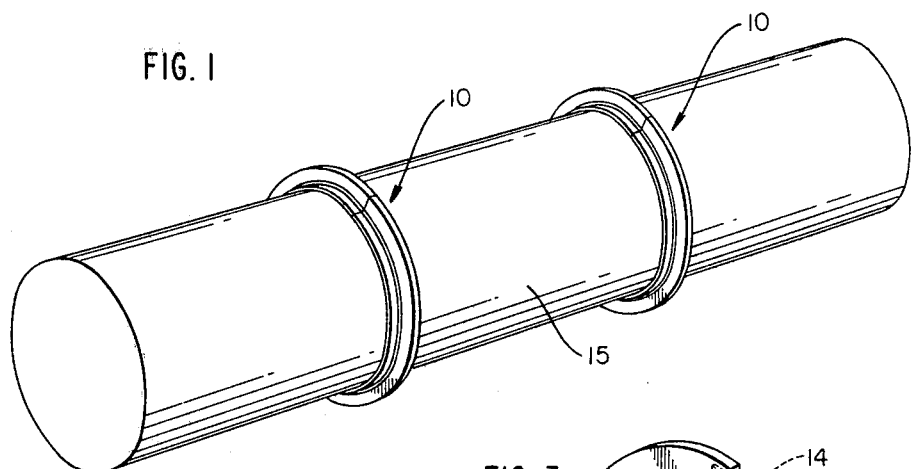
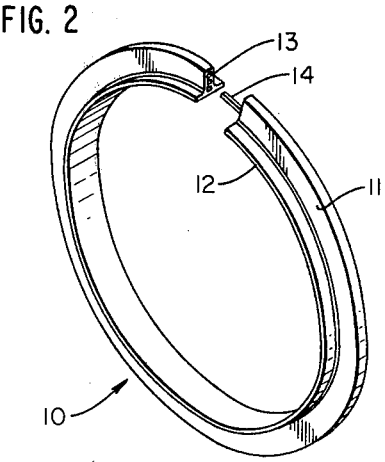
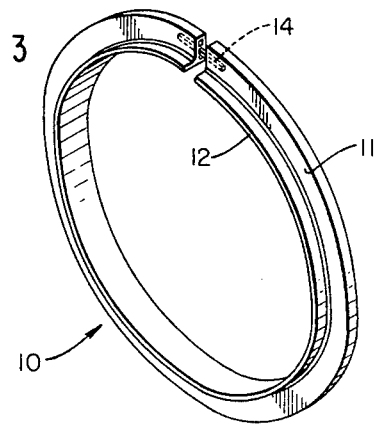
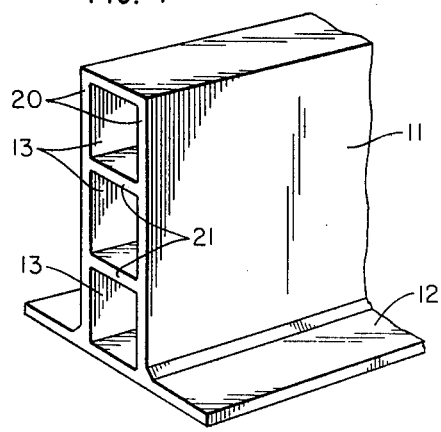

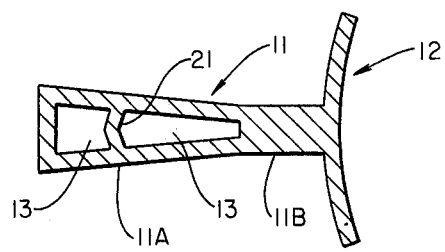
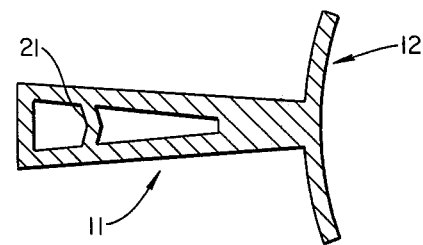
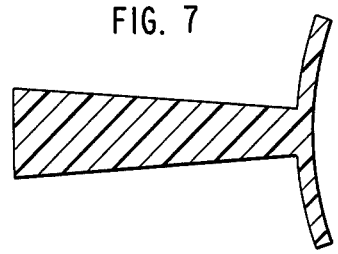
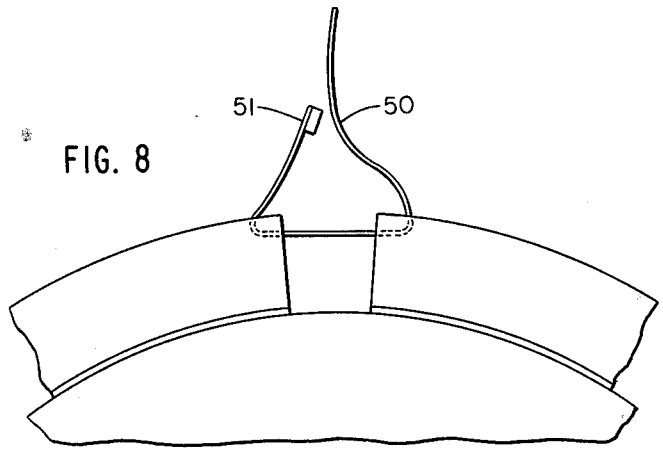

SEPARATOR FOR CONCRETE WRAPPING TO SUBMARINE PIPELINES

This is a division, of application Ser. No. 674,643 filed Apr. 7, 1976.

This invention relates to a spacer for use in the formation of a flexible joint in concrete cladding, such as on heavy pipelines for gas and oil, particularly those which are to be submerged in the sea.

Before heavy pipelines are lowered to the sea bed, or left floating below the waterline, they are coated with a concrete cladding of a thickness of, for instance, 1 to 3 inches (2.5 to 7.5 cms) in order to prevent the normally provided protective coating(s) on the pipelines from becoming damaged by trawler hawsers or by projections on the sea bed. As the pipe is paid out from the pipe-laying vessel it first bends downwardly towards the sea bed and, where it approaches the sea bed, it tends to bend in the opposite direction. This bending can result in the concrete spalling off the pipe. To avoid spalling of the concrete, it has been proposed, in British Pat. Specification No. 1,395,465 to saw cut, at appropriate points, circumferential recesses (usually about ½ inch (1.25 cms) wide and about 2 inches (5 cms) deep) in the concrete cladding. This permits the concrete cladding to flex with the steel pipe.

In practical terms, the recesses are cut with a diamond saw, but, due to the fact that the thickness of the concrete is often not constant, it quite often happens that the saw penetrates the cladding and damages the protective coating on the pipe beneath the cladding. As a result, seawater may subsequently penetrate to, and corrode, the pipe.

British Pat. Specification No. 1,375,465 also suggests that the cladding can be divided into discrete segments, the depressions extending right down to the coating on the pipe. It further suggests that the depressions can be filled with an elastic material, which, in the case where the cladding is formed in a mould, can take the form of spacers provided in the mould and then left in place after the moulding operation.

Attempts have been made to situate spacers on pipes prior to applying the concrete cladding by the more common method of spraying at very high pressure. Prior to the present invention, such attempts have met with only limited success, due to difficulty in preparing and locating the spacers and keeping them in position. Thus, spacers have been individually prepared from planar compressible material and then fixed on the pipe with supporting units in order to keep them upright, i.e. radially of the pipe, during the concrete spraying operation. A strong support is required because the concrete is sprayed at very high pressure, with the results that the spacers have been time consuming and costly to apply, and that the supporting units necessarily remain in the concrete and lead to weakening thereof adjacent the spacers.

According to the present invention there is provided a spacer for use in the formation of a flexible joint in concrete cladding for pipes, such spacer having a base flange, and a web extending generally perpendicular to the base flange on one side thereof such that in cross-section the spacer is generally T-shaped, whereby the spacer, in use, is self supporting on a pipe with the web extending radially thereof, the spacer being flexible and the web being compressible.

Such a spacer will, in use, be located round a pipe with its base flange on the pipe surface, so that the web extends radially of the pipe. As soon as concrete is sprayed on, it will then more firmly anchor the base flange to the pipe and thus help to keep the web upright. By reason of its shape, the spacer retains its position during spraying and subsequently allows flexing of the clad pipe without spalling of the cladding, as well as providing a seal between concrete sections and requiring only a small gap between the sections. The spacer is strong enough not to be squashed against the pipe upon concrete spraying and the web should be of such height that the spacer will not be buried in concrete. To provided the necessary resistance to flexing in the web during spraying of concrete, the web will generally be at least as resistant to bending near its junction with the base flange as at positions remote from the base flange.

When the cladding is complete, it will be in sections separated by the spacers. Upon bending, the compressible webs are compressed to take up the difference in the length of the overall clad pipe along the inside and outside of the bend.

The spacer can be of foam material, provided the foam is sufficiently rigid that the spacer will not simply be crushed by the sprayed concrete. In alternative embodiments, the web is provided with at least one longitudinal internal cavity to provide the required compressibility. There may be opposed side walls bounding the at least one cavity and, where a plurality of cavities are provided, cross members can be provided to separate the cavities, to extend between the side walls and provide resistance to compression. The cavities are preferably straight sided in cross-section, and the web may have parallel sides in which case cavities can be provided throughout its height, one cavity preferably being provided so as to be bounded on one side by the base flange.

Alternatively, the sides of the web may converge at a small angle towards the base flange over at least part of the height of the web. This has the advantage of providing for greater compressibility at the outer edge than the inner edge when the spacer is situated on a pipe, which is in accordance with the greater relative movement at their outer faces of the cladding sections upon bending. A second advantage is that the gap between the sections is as narrow as possible near the base flange.

Where the web is tapered in this way it is preferred for it to be solid over a part of its height immediately adjacent the base flange so as to be sufficiently rigid.

The spacers can be supplied in generally straight or coiled form, to be wound round a pipe, if necessary after cutting to length. However, the spacers of the invention can also be provided in the form of cut rings, and a peg or dowel can be provided on one cut end to engage a hole in the other end to hold the two cut ends together when the rings are placed around a pipe. Alternatively, there may be a strap passing through a hole in one cut end, and a hole to receive the strap in the other cut end, the strap having a ratchet mechanism to assist tightening.

This latter arrangement has the advantage that the ring can be very securely tightened round a pipe until the two cut ends abut, which will tend to ensure that the base flange is firmly seated on the pipe, which is particularly important where, as is often the case, the protective coating or wrapping on the outside of the pipe is not quite circular in cross-section. Other means for holding the cut ends together can be provided.

For application to a pipe, one end of the ring is pulled away from the other, the ring is wrapped round the pipe and the dowel or peg is pressed into the hole thereby effecting a tight junction or, as the case may be, the strap is tightened. Alternatively, the ring can be opened slightly and the ring then threaded over the end of the pipe and the two ends pushed or pulled tightly together thereby reforming a ring which conforms to the outer surface of the pipe. Concrete is then spread on the pipe and by virtue of the presence of the ring a compressible joint is provided enabling the pipe to flex without damaging the concrete.

The spacer is preferably made of PVC although any other polymeric or flexible material (e.g. a synthetic or natural rubber) is suitable for this purpose.

The invention also provides a method of applying concrete cladding to pipes where spacers of the invention are positioned at intervals along a pipe and concrete is sprayed onto the pipe to form discrete sections separated by the spacers. The invention further provides pipes clad by such a method.

Illustrative embodiments of the invention will now be described, by way of example only, with reference to the accompanying drawings, in which:

FIG. 1 is a sketch diagram of a perspective view of a portion of pipeline with two compressible spacers in accordance with the present invention, in position round the pipe;

FIG. 2 is a perspective view of a spacer in the form of a ring with its ends separated;

FIG. 3 is a perspective view of the spacer ring of FIG. 2 with its two ends pressed together;

FIG. 4 is a perspective view on a larger scale of one end of the spacer ring of FIG. 2;

FIGS. 5, 6 and 7 are cross-sections of alternative spacers of the invention; and FIG. 8 is a partial side view of a spacer of the invention in the form of a ring and provided with a strap for securing the ring in place.

Referring initially to FIGS. 2 and 4, a spacer of the invention is shown as a ring 10 which is of inverted T-shaped cross-section and comprises a base flange 12 and an upstanding web 11 integral with the flange 12. The ring 10 which is split as shown in FIG. 2, is made of a resilient material such as PVC or other suitable polymeric material.

The upstanding web 11 is of cellular construction and includes a plurality of compartments 13 (FIG. 4), formed between side walls 20 of the web. The side walls 20 are, in this embodiment, parallel and there are three compartments between the base flange 12 and the free end of the web, these being defined by cross members 21 extending between the side walls and providing resistance to compression. The height of the web 11 is preferably of the order of 3 inches (7.5 cms) thereby ensuring that when the ring 10 is placed on a pipe 15 (FIG. 1) which is subsequently clad in concrete of 1 to 3 inches (2.5 to 7.5 cm) thick, it is not completely covered by the concrete.

In order to fix the ring 10 in position about the pipe 15, a peg or dowel 14 is inserted into an exposed end of one compartment 13, the ring 10 is placed in position and the dowel 14 is then pushed into the other exposed end of the ring to fasten the ends together as shown in FIG. 3. The dowel 14 is a friction fit in the compartments 13 and in order to resist any tendency for the ends of the ring 10 from pulling apart the dowel may have barbs or other suitable means thereon.

It is possible that in some cases the ring 10 will be sufficiently resilient to remain in position without the need for any fastening devices such as dowels, due to friction between the base flange 12 and the surface of the coated pipe 15.

Of course, the spacer need not be supplied in the form of a ring, it can be supplied in straight lengths or coiled, to be cut to size prior to use and then located round a pipe.

It will be noted than in the above described embodiment the side walls 20 are parallel, and they in fact join the base flange 12 with a slight beading so that the web is more resistant to bending near the base than near its free end. This ensures that the web will tend to remain upright when concrete is applied.

FIGS. 5 and 6, in which like numerals indicate like parts as in previous Figures, show cross-sections of alternative embodiments where the sides of the web 11 are not parallel. In FIG. 5 the sides 11 converge at a small, constant, angle towards the base flange over an outer part 11A of the web, whereafter the sides continue parallel to each other towards the base flange 12 in a part 11B of the web. The slightly narrower part 11B is solid to provide greater resistance to bending, while part 11A includes two compartments 13. The single cross member 21 is, in this case, not straight, it is kinked so as to reduce the resistance to compression of part 11A.

The FIG. 6 embodiment is similar to that of FIG. 5, the only differences being that the sides of the web 11 converge at a small angle towards the base flange throughout their length, and that in this case the angle included in the cross member 21 is outwards, rather than inwards, relative to the base flange 12. Both these embodiments have webs narrower and less compressible near the base flange than in outward parts. This assists the sealing function in use because greater compression will obviously occur on pipe flexing in the outer parts of the webs.

The embodiment of FIG. 7 has a similar outline to that of FIG. 6, but in this case the spacer is made of foamed material. Other cross-sections are, of course, possible for foamed material spacers of the invention.

FIG. 8 is a side view of part of a spacer of the invention in the form of a ring, and shows an alternative means which can be provided for securing the ring. A strap 50 passes through holes in each end of the spacer. One end of the strap has a buckle 51 including a ratchet arrangement, so that when the free end 52 of the strap is passed therethrough the strap can be tightened to impart considerable tension to the ring. The ends can be drawn together, the material being somewhat elastic, to provide a continuous ring with the base flange firmly contacting the surface of a pipe or the wrappings or coating thereon even when that surface is not quite circular.

When preparing a pipeline for laying, the rings 10 may be prepositioned on each section of pipe 15 as shown in FIG. 1, assuming that the pipe 15 has a protective coating thereon or in the case of pipe sections being uncoated or the pipeline being fabricated on site from steel strip, the rings 10 are positioned on the pipeline after the protective coatings have been applied. The spacing of the rings 15 on the pipe sections or pipeline may correspond to the distance between successive saw cuts through the concrete cladding as has been done heretofore to prevent spalling of the concrete. Once the rings 15 are in position, a concrete cladding (not shown)

is formed on the pipeline. The cladding overlaps the flange 12 leaving the top of the web 11 exposed.

The spacers 10 may be preformed by moulding and supplied as split-rings with their ends to be joined, e.g. by dowels. However, in the case of a large diameter pipeline the spacer 10 may comprise a predetermined length of extrusion which is wrapped about the pipe and with the ends to be connected, e.g. using dowels.

I claim:

1. A method of applying concrete cladding to pipes wherein spaces each comprising in combination a base flange having opposed sides, a web extending generally perpendicularly from the base flange from one said side, the cross-section of the spacer being generally T-shaped, the spacer being flexible, the web being compressible and the web being at least as resistant to bending adjacent the base flange as at positions remote from the base flange, are positioned at intervals along the pipe such that the side of the flanges of said spacers opposite the sides from which said webs extend are adjacent the pipe, and concrete is sprayed onto the pipe to form discrete sections separated by the spacers.

2. A method as claimed in claim 1, wherein said spacers are made of foamed material.

3. A method as claimed in claim 1, wherein as least one longitudinal cavity is provided in the web of said spacers.

4. A method as claimed in claim 3, wherein said spacers include opposed side walls to the web, said side walls bounding said at least one cavity.

5. A method as claimed in claim 4, wherein there is a plurality of said cavities and cross members are provided extending between said side walls of said spacers.

6. A method as claimed in claim 1, wherein the opposite side faces of said web are parallel.

7. A method as claimed in claim 5, wherein the opposite side faces of the web are parallel and one said cavity is bounded on one side by said base flange.

8. A method as claimed in claim 1, wherein the opposite side faces of said web converge at a small angle toward the base flange over at least part of the height of the web perpendicular to said base flange.

9. A method as claimed in claim 8, wherein the web is solid over a part of its height immediately adjacent the base flange.

10. A method as claimed in claim 9 wherein said spacers have two longitudinal cavities in the web and a cross member separating said cavities, the cross member being, in cross-section of the spacer, not straight.

11. A method as claimed in claim 1, wherein said spacers are in the form of a cut ring having two cut ends extending around the circumference of the pipe.

12. A method as claimed in claim 11, wherein said spacers include a peg on one cut end of the ring to be received and engaged with the other cut end of the ring upon location of the ring around the pipe.

13. A method as claimed in claim 11, wherein said spacers include a strap passing through a hole in one cut end, a hole to receive the strap in the other cut end, and a ratchet mechanism on the strap to assist tightening thereof.

* * * * *